US012674224B2

(12) United States Patent
Schüring et al.

(10) Patent No.: US 12,674,224 B2
(45) Date of Patent: Jul. 7, 2026

(54) GAS INJECTION DEVICE

(71) Applicant: SMS group GmbH, Düsseldorf (DE)

(72) Inventors: Andreas Schüring, Mülheim (DE); Nikolaus Peter Kurt Borowski, Düsseldorf (DE)

(73) Assignee: SMS group GmbH, Düsseldorf (DE)

( * ) Notice: Subject to any disclaimer, the term of this patent is extended or adjusted under 35 U.S.C. 154(b) by 593 days.

(21) Appl. No.: 17/925,112

(22) PCT Filed: Mar. 26, 2021

(86) PCT No.: PCT/EP2021/057957
§ 371 (c)(1),
(2) Date: Nov. 14, 2022

(87) PCT Pub. No.: WO2021/228464
PCT Pub. Date: Nov. 18, 2021

(65) Prior Publication Data

US 2023/0349025 A1 Nov. 2, 2023

(30) Foreign Application Priority Data

May 14, 2020 (DE) ..................... 10 2020 206 078.9
Dec. 1, 2020 (DE) ..................... 10 2020 215 085.0

(51) Int. Cl.
*F27D 3/16* (2006.01)
*C22B 9/05* (2006.01)
*C22B 15/00* (2006.01)

(52) U.S. Cl.
CPC .............. *C22B 15/006* (2013.01); *C22B 9/05* (2013.01); *C22B 15/0054* (2013.01); *F27D 3/16* (2013.01);
(Continued)

(58) Field of Classification Search
CPC ..... C22B 15/006; C22B 9/05; C22B 15/0054; F27D 3/16; F27D 2003/166; F27D 2003/169; F27D 2027/002; F27D 27/00
(Continued)

(56) References Cited

U.S. PATENT DOCUMENTS 2,805,147 A * 9/1957 Schreiber .............. C21C 5/4606 266/217
3,201,104 A * 8/1965 Berry .................... C21C 5/4613 239/548
(Continued)

FOREIGN PATENT DOCUMENTS

CN 110055429 A 7/2019
DE 1015609 B 9/1957
(Continued)

OTHER PUBLICATIONS

International Search Report and Written Opinion issued on Jun. 28, 2021, in corresponding International application No. PCT/EP2021/057957; 17 pages (with English Translation).
(Continued)

*Primary Examiner* — Jessee R Roe
*Assistant Examiner* — Michael Aboagye
(74) *Attorney, Agent, or Firm* — Maier & Maier, PLLC

(57) ABSTRACT

A gas injection device for introducing a process gas into a non-ferrous metal melt and/or slag, in particular a copper melt and/or copper slag, including a hollow-cylindrical lance which is formed from a refractory material and/or graphite, preferably includes a refractory material and/or graphite. The lance has an inlet opening for the process gas and a gas injection module connected to the hollow-cylindrical lance and formed from a refractory material and/or graphite, preferably including a refractory material and/or graphite, with at least one outlet opening for the process gas.
(Continued)

The outlet opening includes at least one through-flow element formed from a ceramic material via which the process gas can be introduced into the melt.

13 Claims, 8 Drawing Sheets

(52) U.S. Cl.
CPC .. *F27D 2003/166* (2013.01); *F27D 2003/169* (2013.01)

(58) Field of Classification Search
USPC ......................................... 266/161, 217, 225
See application file for complete search history.

(56) References Cited

U.S. PATENT DOCUMENTS

| | | | | |
|---|---|---|---|---|
| 3,799,522 | A * | 3/1974 | Brant | C22B 21/064 266/225 |
| 3,802,681 | A * | 4/1974 | Pfeifer | C21C 5/4606 239/132.5 |
| 3,902,895 | A * | 9/1975 | Wuth | C22B 9/05 75/649 |
| 4,042,223 | A * | 8/1977 | Langhammer | C21C 5/4613 266/225 |
| 4,148,468 | A * | 4/1979 | Korber | C21C 7/072 266/225 |
| 4,541,617 | A * | 9/1985 | Okane | F27D 3/18 266/65 |
| 5,156,801 | A * | 10/1992 | Rothrock, Jr. | B22D 1/005 266/225 |
| 6,056,803 | A * | 5/2000 | Waite | C22B 21/064 266/217 |
| 6,368,550 | B1 * | 4/2002 | Wagener | C21C 7/10 266/225 |
| 8,178,036 | B2 * | 5/2012 | Neff | C21C 1/06 266/233 |
| 2017/0176106 | A1 | 6/2017 | Cooper | |

FOREIGN PATENT DOCUMENTS

| | | | |
|---|---|---|---|
| DE | 2306398 | B1 | 8/1974 |
| DE | 2528672 | B1 | 2/1976 |
| DE | 2709155 | A | 9/1978 |
| DE | 202007013385 | U1 | 11/2007 |
| EP | 2341155 | A1 | 7/2011 |
| EP | 2044229 | B1 | 3/2018 |
| EP | 3363919 | A1 | 8/2018 |
| EP | 3363920 | A1 | 8/2018 |

OTHER PUBLICATIONS

International Preliminary Report on Patentability issued on Apr. 20, 2022, in corresponding International application No. PCT/EP2021/057957; 30 pages (with English Translation).

International Preliminary Report on Patentability issued on Oct. 20, 2022, in corresponding International application No. PCT/EP2021/057957; 30 pages (with English Translation).

* cited by examiner

GAS INJECTION DEVICE

FIELD

The present invention relates to a gas injection device for introducing a process gas into a non-ferrous metal melt and/or slag, in particular a copper melt and/or copper slag. In a further aspect, the present invention relates to a plant for the extraction of non-ferrous metals, in particular copper, and a plant for processing, cleaning and/or refining of non-ferrous metal slags, in particular copper slags, comprising the gas injection device according to the invention. Furthermore, the present invention relates to the use of the gas injection device according to the invention for the extraction of non-ferrous metals, in particular copper, or for processing, cleaning and/or refining of non-ferrous metal slags, in particular copper slags.

BACKGROUND

Such devices are generally known in the prior art and consist substantially of a steel tube which has several outlets at its one end for introducing a gas into a metal melt. The steel tube is typically coated with a refractory protective layer and thus protected against the metal melt.

For example, DE 27 09 155 discloses a lance for a flushing gas treatment of non-ferrous metal melts with an inert gas. The lance consists of a steel tube with a lance head made of gas-permeable sinter metal welded to its one end. The steel tube and the lance head are coated with a protective ceramic layer based on enamel.

The German utility model DE 20 2007 013 385 U1 discloses a stirring device for an aluminum alloy with a hollow shaft, at one end of which a rotor made of graphite is detachably arranged. The hollow shaft consists of a steel tube which has a graphite coating.

From US 2017/0176106 A1 another flushing device for a flushing gas treatment of metal melts with an inert gas is known. The flushing device comprises a steel motor shaft, an impeller shaft and an impeller connected to the impeller shaft. The impeller shaft as well as the impeller are made of graphite and impregnated with a ceramic material.

The European patent application EP 3 363 919 A1 describes a method for producing low-hydrogen copper in a melting furnace. Here, a rotating impeller is immersed in the copper melt, through which an inert flushing gas, such as nitrogen, is introduced into the copper melt and distributed. The impeller can consist of ceramic, of graphite or a mixture of ceramic and graphite.

During the process, the lances are exposed to high temperature gradients when they are immersed in the metal melt or pulled out of the metal melt. The lance is suddenly heated when it is immersed, but is suddenly cooled when it is pulled out. Due to the different coefficients of thermal expansion of the respective materials from which the lances are made, cracks form over time which have a disadvantageous effect on the service life of such lances.

SUMMARY

Against this background, the present invention is therefore based on the object of specifying a gas injection device for introducing a process gas into a non-ferrous metal melt, in particular a copper melt, which is improved compared to the prior art. According to a further aspect, the present invention is based on the object of an improved plant, in particular a plant for the extraction of non-ferrous metals, in particular copper, and a plant for processing, cleaning and/or refining of non-ferrous metal slags, especially copper slags.

The gas injection device according to the invention is provided for introducing a process gas, such as an oxygen-containing gas or natural gas, into a non-ferrous metal melt and/or a slag, in particular into a copper melt and/or copper slag. The gas injection device comprises a hollow-cylindrical lance formed from a refractory material and/or graphite, preferably consists of a refractory material and/or graphite, wherein the lance has an inlet opening for the process gas and a gas injection module which is connected to the hollow-cylindrical lance and formed from a refractory material and/or graphite, preferably consists of a refractory material and/or graphite. The gas injection module formed from a refractory material and/or graphite, preferably consisting of a refractory material and/or graphite, has at least one outlet opening for the process gas, wherein the outlet opening comprises at least one through-flow element formed from a ceramic material and via which the process gas can be introduced into the melt.

The present invention is based on the essential finding that through the targeted use of a refractory material and/or of graphite in combination with a ceramic material, a gas injection device can be produced which has a low sensitivity to temperature shocks. This low sensitivity to the temperature shocks to which a gas injection device is exposed in the process by being immersed in the metal melt or being pulled out of the metal melt is based on the fact that both materials have similar coefficients of thermal expansion. As a result, the formation of thermal cracks can be significantly reduced, which leads to an improved service life of such gas injection devices.

The targeted use of a ceramic for the element through which the process gas can flow has a particularly advantageous effect, since the burning of refractory material and/or of the graphite, which inevitably occurs when using process gases with a high oxygen content and the very high temperatures of the metal melt, can be reduced.

Through the use of refractory materials and/or graphite as the material for the lance and for the gas injection module, the use of steel components can be largely dispensed with. This is particularly advantageous when the non-ferrous metal melt is a copper melt and/or a copper slag. Since copper is better than iron in terms of its redox potential, the use of steel components would result in the iron slagging when the lance comes into contact with the oxide-containing copper melt and thus destroying the lance.

Advantageously, the graphite has particularly positive properties, since it possesses low wettability. Buildup of the freezing metal melt can thus be effectively reduced.

The at least one through-flow element formed from the ceramic material, which is arranged in the outlet opening of the gas injection module, can be firmly connected to it by means of different connection techniques. The element can preferably be connected to the gas injection module by means of a press connection, by means of a screw connection and/or an adhesive bond. In a particularly advantageous embodiment variant such an element can be cast into a refractory mass of material.

Further advantageous configurations of the invention are indicated in the dependent claims. The features listed individually in the dependent claims can be combined with one another in a technologically meaningful manner and can define further configurations of the invention. In addition, the features indicated in the claims are specified and explained in more detail in the description, wherein further preferred configurations of the invention are represented.

The ceramic material is preferably selected from the group comprising silicon carbides, silicon nitrides, silicon aluminum oxide nitrides, boron nitrides, zirconium oxides, titanium oxides and/or mixtures thereof. The ceramic material is very particularly preferably selected from the group consisting of $Al_2O_3$, MgO, $SiO_2$, SiC, CaO, FeO, $Fe_2O_3$, $Fe_3O_4$, $ZrO_2$, $TiO_2$, BN, $Cr_2O_3$, possibly further comprising alkaline components and/or iron needles and/or mixtures thereof. The ceramic material can also be a ceramic matrix material formed from a mixture of the oxides selected from the series comprising $Al_2O_3$, MgO, $SiO_2$, SiC, CaO, FeO, $Fe_2O_3$, $Fe_3O_4$, $ZrO_2$, $TiO_2$, BN, $Cr_2O_3$, alkaline components and iron needles.

In the sense of the present invention, the term "refractory material" is understood to mean ceramic products, such as inorganic non-metallic materials, which have a softening point of at least 1500° C., wherein the softening point is determined using a Seger cone in accordance with DIN 51063. The main components of these inorganic non-metallic materials may have at least one or more of the oxides selected from the group consisting of silica, alumina, magnesia, calcia, zirconia, chromia and/or mixtures thereof. In addition, carbon (C) and silicon carbide (SiC) can form other components of these inorganic non-metallic materials.

It is therefore preferably provided that the refractory material is selected from one or more of the oxides selected from the series comprising silicon dioxide, aluminum oxide, magnesium oxide, calcium oxide, zirconium oxide, chromium oxide and/or mixtures thereof, possibly in combination carbon (C) and/or silicon carbide (SIC).

In a particularly preferred embodiment variant, the refractory material is selected from the series comprising $Al_2TiO_5$, SiC, $Si_3N_4$, ZrO and/or $ZrO_2$.

In order to have flexibility with regard to the respective required length of the hollow-cylindrical lance, it is advantageously formed from several individual hollow-cylindrical lance bodies that can be connected to one another. To connect the individual lance bodies, they have, for example, conical threads, via which they can be screwed together.

In a particularly advantageous embodiment, the gas injection module is formed in a cup-shape, wherein the at least one, preferably several, outlet openings are arranged in a lateral surface of the gas injection module formed in a cup-shape. In this context, it is preferably provided that the through-flow element formed from the ceramic is formed in the form of a nozzle, which is inserted into the at least one outlet opening and is firmly connected to the gas injection module. The nozzle formed from the ceramic material can be, for example, cast in, connected to the gas injection module by means of a press connection and/or an adhesive bond. Possibly, a screw connection can also be provided. For this purpose, the nozzle comprises an external thread and the outlet opening comprises a corresponding mating thread into which the nozzle can then be screwed.

Due to the modular structure, the nozzles formed from the ceramic material can be specifically configured and manufactured—in terms of geometry—to the desired gas pressures and volume flows.

Depending on the type of nozzle, the available pressure and volume flow can be optimally implemented to the liquid non-ferrous metal melt and/or slag. In principle, the higher the available pressure, the higher the outflow speed or the greater the impulse that can be implemented. Therefore, due to the high outflow speeds or due to the large impulse, high bath penetration depths and thus strong bath movements can be generated, which lead to the collapse of large process gas bubbles and thus to the formation of many small process gas bubbles. These small process gas bubbles can be distributed particularly well in the non-ferrous metal melt and have a large surface area. The process gas to be introduced into the non-ferrous metal melt and/or slag can therefore be implemented more effectively.

The nozzle is preferably arranged in the at least one outlet opening in such a way that its longitudinal axis has an angle of 45° to 90° with respect to the longitudinal axis of the lance, preferably an angle of 60° to 80° with respect to the longitudinal axis of the lance. The nozzle can thus be arranged horizontally or inclined in the direction of the distal end of the lance. The inclined embodiment variant has a particularly advantageous effect on the possible bath penetration depth.

A particularly high level of efficiency is achieved when the nozzle is designed as a Laval nozzle. The smallest possible process gas bubbles are realizable in the non-ferrous metal melt and/or the slag by means of a Laval nozzle. The higher level of efficiency has a particularly advantageous effect on the process costs.

In a further advantageous embodiment variant, the gas injection module is formed in the form of a shower head and has several outlet openings aligned in the direction of the inlet opening of the lance. In this context, it is particularly preferred that the through-flow element formed from the ceramic material is formed in the form of a perforated plate or a porous plate, which is inserted into the respective outlet openings of the shower head and is firmly connected to it.

The several outlet openings can be arranged in a circle or alternatively in a square.

The perforated plate formed from the ceramic material or the porous plate can, for example, be cast in the refractory material. Alternatively and/or in addition, the perforated plate formed from the ceramic material or the porous plate can be connected to the gas injection module by means of a press connection, a screw connection, a bolt connection and/or by gluing. However, advantageously casting in of the perforated plate formed from the ceramic material or the porous plate is provided. For this purpose, the perforated plate or the porous plate comprises a step that is cast into the gas injection module. Through this step, on the one hand, gas tightness can be achieved and, on the other hand, forces resulting from the internal gas pressure and/or the metallostatic pressure of the liquid metal/slag column above the module, can be transferred from the perforated plate or the porous plate into the gas injection module.

The outlet openings aligned in the direction of the lance are preferably arranged such that their longitudinal axis has an angle of 0° to 45° with respect to the longitudinal axis of the lance, preferably an angle of 3° to 15° with respect to the longitudinal axis of the lance.

This embodiment variant is particularly advantageous when the available pressure is limited. In this case, only the pressure at the outlet of the openings of the perforated plate or the porous plate has to be higher than the metallostatic pressure of the non-ferrous metal melt and/or slag above. The size of the openings determines the size of the process gas bubbles. It is therefore preferably provided that the plurality of openings in the perforated plate, through which the process gas can be injected into the non-ferrous metal melt and/or slag, are dimensioned such that the smallest possible process gas bubbles in the metal melt and/or slag arise.

A sufficient distance between the individual openings can also prevent the process gas bubbles from merging on the upper side of the perforated plate. The perforated plate is therefore preferably configured in such a way that the distance between one opening and the next adjacent opening is at least 3 times, more preferably at least 5 times, the opening diameter. The resulting rising curtain of gas bubbles also leads to low turbulent bath movement on the surface of the metal melt.

In another advantageous embodiment variant, the gas injection module is formed in the form of an impeller wheel, wherein the at least one outlet opening is arranged centrally in the impeller wheel. On the one hand, the impeller wheel enables a particularly effective mixing of the non-ferrous metal melt and/or slag and on the other hand a fine distribution of the process gas introduced into the metal melt and/or slag.

According to a first embodiment variant, the through-flow element formed from the ceramic material is formed in the form of a sleeve that is closed on one side and is inserted into the at least one outlet opening of the impeller wheel and is firmly connected to it, wherein the sleeve has at least one, preferably several outlet channels arranged perpendicular to its longitudinal axis through which the process gas can be introduced into the melt. The diameter of the outlet channels can be used to specify the size of the process gas bubbles that emerge from the underside of the rotating impeller. The rotation of the impeller wheel can break up the individual gas bubbles and distribute them radially in the non-ferrous metal melt. The distribution is thus possible over a larger area than with a conventional nozzle and/or lance. Irrespective of the introduction of a process gas and the flow generated by the rising gas bubbles, the bubbles contained in the melt can be further distributed simply by rotating the impeller wheel, so that a wide distribution of the process gas bubbles in the non-ferrous metal melt and/or slag is made possible.

According to a second embodiment variant, the through-flow element formed from the ceramic material is formed in the form of a cylindrical sleeve open on both sides, which is inserted into the at least one outlet opening and firmly connected to the impeller wheel, for example by means of a press connection or a screw connection. In this embodiment variant, the process gas exits in the form of larger process gas bubbles and is then broken up into smaller process gas bubbles by the rotation of the impeller wheel.

The sleeve formed from the ceramic material can be for example connected to the gas injection module by means of a press connection or an adhesive bond. Advantageously, however, casting of the sleeve is provided.

According to a second aspect, the invention relates to a plant for the extraction of non-ferrous metals, in particular copper, comprising the gas injection device according to the invention.

According to a third aspect, the invention relates to a plant for treating, cleaning and/or refining of non-ferrous metal slags, in particular copper slags, comprising the gas injection device according to the invention.

According to a fourth aspect, the present invention also relates to the use of the gas injection device according to the invention for the extraction of non-ferrous metals, in particular copper, or for processing, cleaning and/or refining of non-ferrous metal slags, in particular copper slags.

Furthermore, the gas injection device can comprise a drive shaft which is connected to a motor. Preferably, the drive shaft can also be formed from a refractory material and/or graphite, particularly preferably it consists of the refractory material and/or graphite. The gas injection device can then be cast onto the drive shaft, so that areas of the gas injection device that are particularly stressed can be designed to be more resistant through the use of the corresponding materials.

BRIEF DESCRIPTION OF THE FIGURES

In the following, the invention and the technical environment will be explained in greater detail with reference to the figures. It should be pointed out that the invention should not be limited by the exemplary embodiments shown. In particular, unless explicitly stated otherwise, it is also possible to extract partial aspects of the facts explained in the figures and combine them with other components and findings from the present description and/or figures. In particular, it should be pointed out that the figures and in particular the proportions represented are only schematic. The same reference numerals designate the same objects, so that explanations from other figures can be used as a supplement if necessary. In the figures.

DETAILED DESCRIPTION

Figure 1:
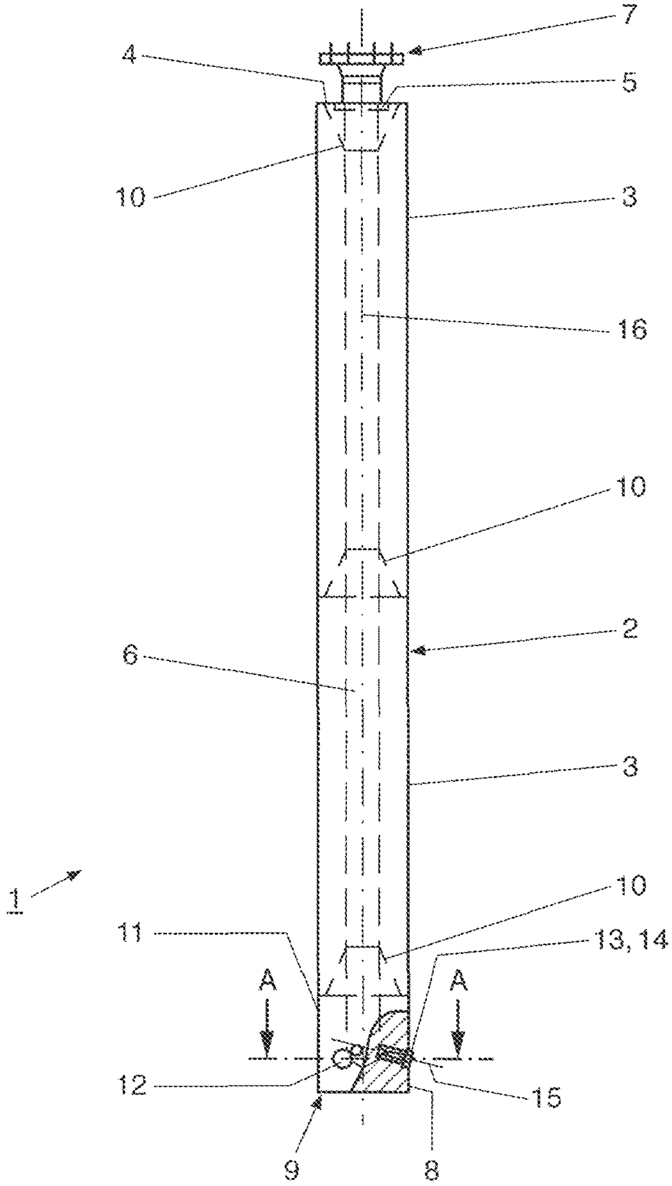
FIG. 1 shows a first embodiment of the gas injection device according to the invention.

FIG. 1 shows a first embodiment variant of the gas injection device 1 according to the invention. The gas injection device 1 according to the invention is provided for introducing a process gas, such as an oxygen-containing gas or natural gas, into a non-ferrous metal melt and/or slag, in particular into a copper melt and/or copper slag.

The gas injection device 1 comprises a hollow-cylindrical lance 2 which consists of a refractory material, preferably $Al_2TiO_5$ or SiC, more preferably $Si_3N_4$, and most preferably ZrO or $ZrO_2$, and in the present embodiment variant is formed from two individual lance bodies 3. An inlet opening 5 for the process gas is provided at a first distal end 4 of the lance 2 and opens into a main channel 6 of the lance 2. In the present case, the gas injection device 1 has a connecting piece 7 for connection to a process gas line (not represented). At the end 8 axially opposite to the first distal end 4, the gas injection device 1 has a gas injection module 9 connected to the hollow-cylindrical lance 2 and also consisting of a refractory high-performance material, preferably of $Al_2TiO_5$ or SiC, more preferably of $Si_3N_4$, and most preferably of ZrO or $ZrO_2$. The individual modules 3, 7 are connected to one another via screw connections.

As can be seen from the embodiment variant represented in FIG. 1, the gas injection module 9 is cup-shaped and has three outlet openings 12 arranged in its lateral surface 11, via which the process gas can be introduced into the non-ferrous metal melt and/or slag. In each of the outlet openings 12, a respective through-flow element 13 formed from a ceramic material element is arranged, which in the present case is formed in the shape of a nozzle 14, in particular a Laval nozzle 14.

In an alternative embodiment variant (not represented), the cup-shaped gas injection module 9 can be formed integrally with the lance body 3, so that both the lance body 3 and the cup-shaped gas injection module 9 are formed from a single element.

Figure 2:
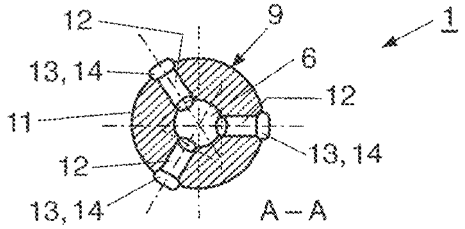
FIG. 2 shows a cross-sectional representation of the embodiment variant shown in FIG. 1 according to section plane A-A.

FIG. 2 shows a cross-sectional representation of the embodiment variant shown in FIG. 1 according to section plane A-A. The three outlet openings 12, which are arranged in the lateral surface 11 of the gas injection module 9 at the same distance from one another and extend radially from the main channel 6 can be seen here in particular.

Figure 3:
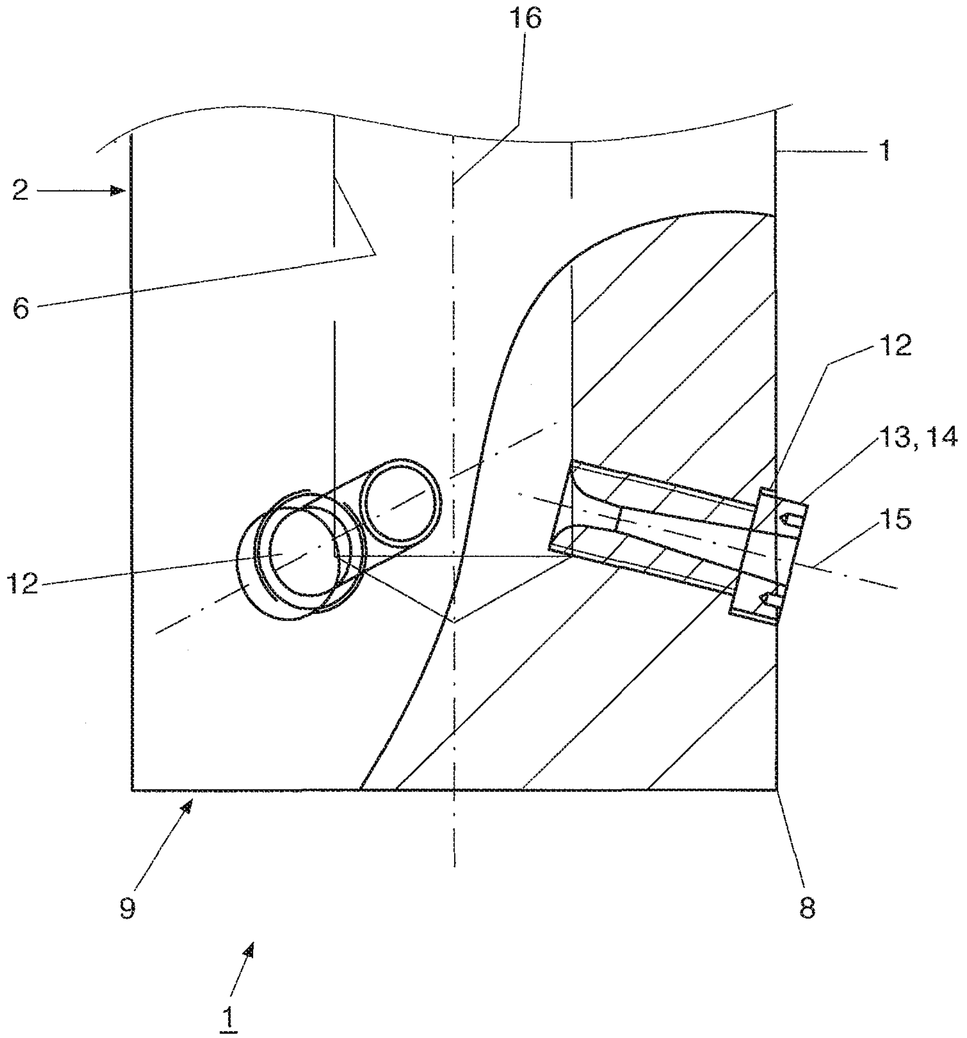
FIG. 3 shows a detailed view of the lower part of the gas injection device according to the first embodiment variant.

FIG. 3 shows a detailed view of the lower part of the gas injection device 1 according to the embodiment variant explained above, in which each of the Laval nozzles 14 is firmly connected to the gas injection module 9 by means of a press connection. Alternatively, each of the Laval nozzles 14 can be glued by means of a high-temperature adhesive or cast into the gas injection device 1. As can also be seen from the representation in FIG. 3, each of the channel-like outlet openings 12 is inclined in the direction of the second distal end 8 of the lance 2. In other words, the longitudinal axis 15 of each of the channel-like outlet openings 12 or each of the Laval nozzles 14 has an angle in relation to the longitudinal axis 16 of the lance 2, which is 75° in the present embodiment variant.

Figure 4:
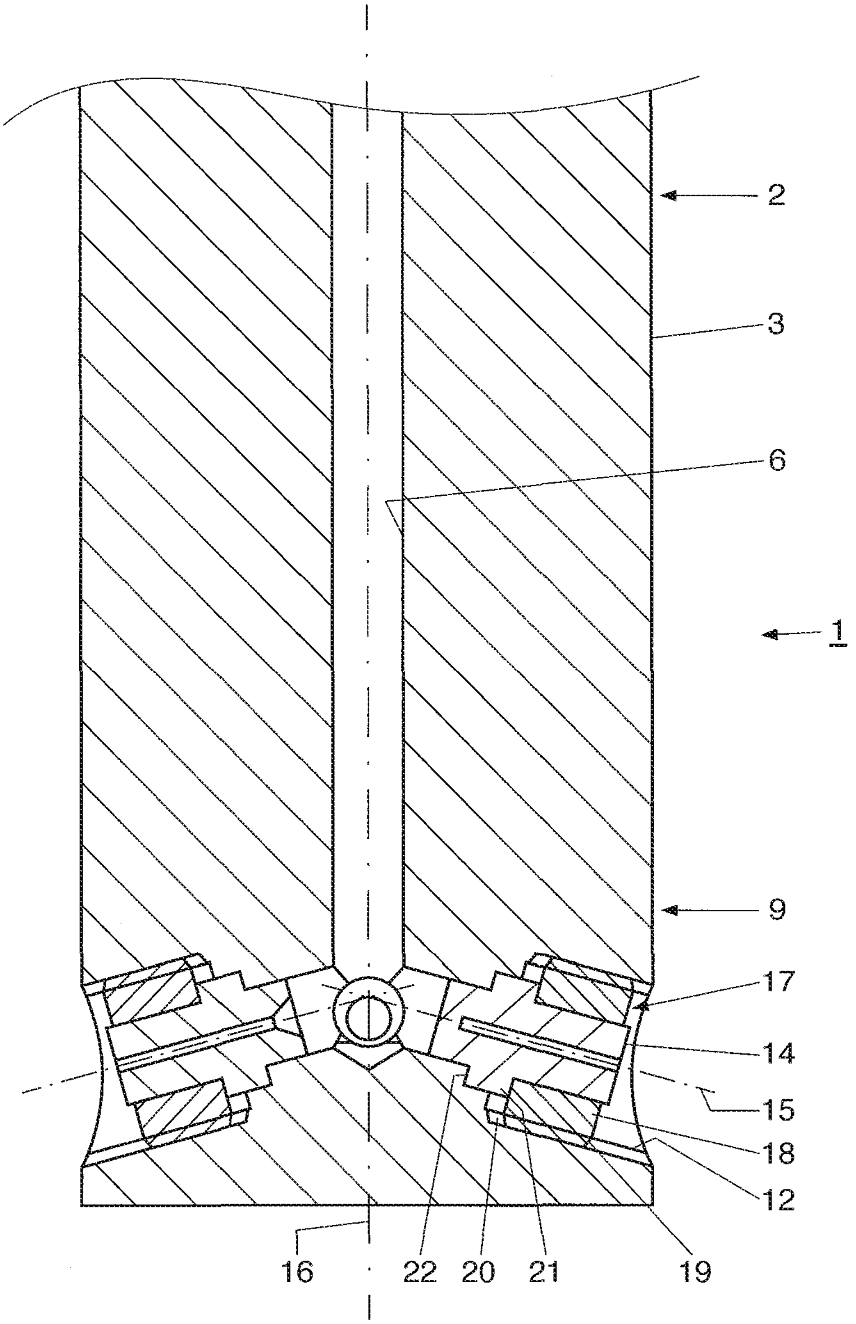
FIG. 4 shows a detailed view of the lower part of the gas injection device according to a second embodiment variant.

FIG. 4 shows a lower section of a second embodiment variant of the gas injection device 1 according to the invention. In the present case, the gas injection module 9 is integrally formed with the lance body 3 of the lance 2. In contrast to the previous embodiment variant, the Laval nozzles 14 are fixed to the gas injection module 9 or the lance body 3 of the lance 2 by means of a screw connection 17. The screw connection 17 comprises a nut 18 made of the refractory material with an external thread 19 which can be screwed into the outlet opening 12 which has a mating thread 20. As can be seen from FIG. 4, the Laval nozzle 14 comprises a flange 21 via which the nut 18 fixes the Laval nozzle 14 against a stop surface 22 of the outlet opening 12. Alternatively, the nut 18 consisting of the refractory material can be glued into the outlet opening 12 of the gas injection module 9 by means of a high-temperature adhesive or alternatively cast.

Figure 5:
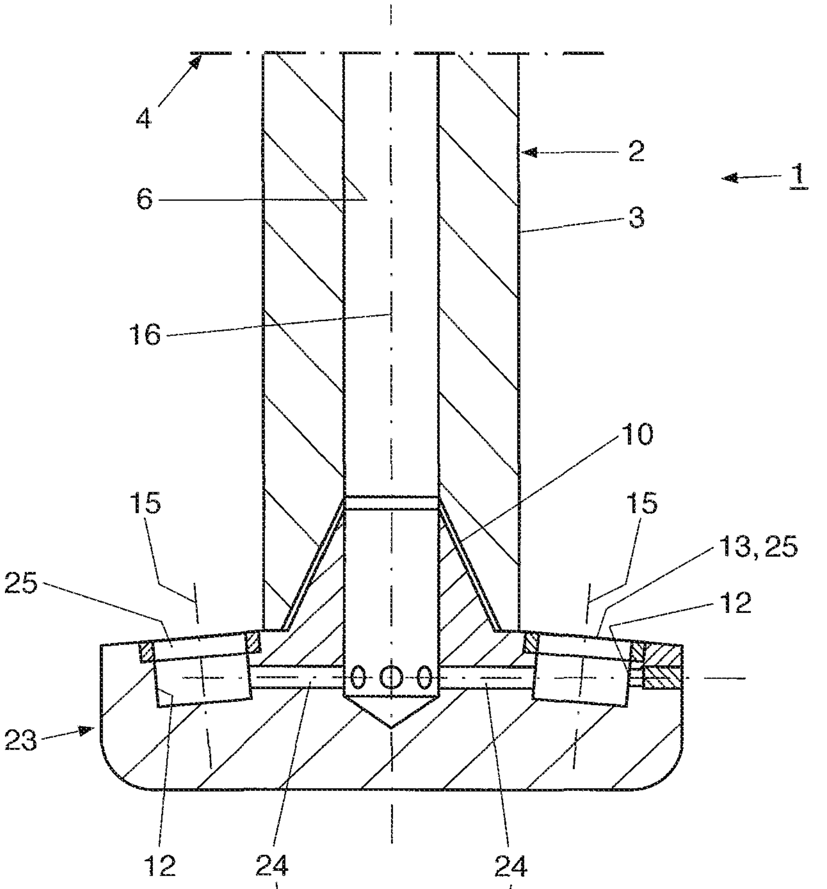
FIG. 5 shows a third embodiment variant of the gas injection device according to the invention in a sectional view.

A further advantageous embodiment variant of the gas injection device 1 according to the invention is represented in FIG. 5. The gas injection module is formed here in the form of a shower head 23 which has a plurality of outlet openings 12 arranged in a circular line and aligned in the direction of the first distal end 4 of the gas injection device 1. Each one of the outlet openings 12 communicates with the main channel 6 of the lance 2 via a channel 24. As can be seen from FIG. 5, the outlet openings 12 are slightly tilted in relation to the longitudinal axis 16 of the lance 2. Its longitudinal axis 15 has an angle of 5° in relation to the longitudinal axis 16 of the lance 2. The through-flow element 13 formed from the ceramic material is in the present case formed in the form of a perforated plate 25 which is inserted into the respective outlet openings 12 of the shower head 23 and is firmly connected to it via a high-temperature-resistant adhesive connection. Alternatively and/or in addition, it can be cast into the gas injection device 1.

Figure 6:
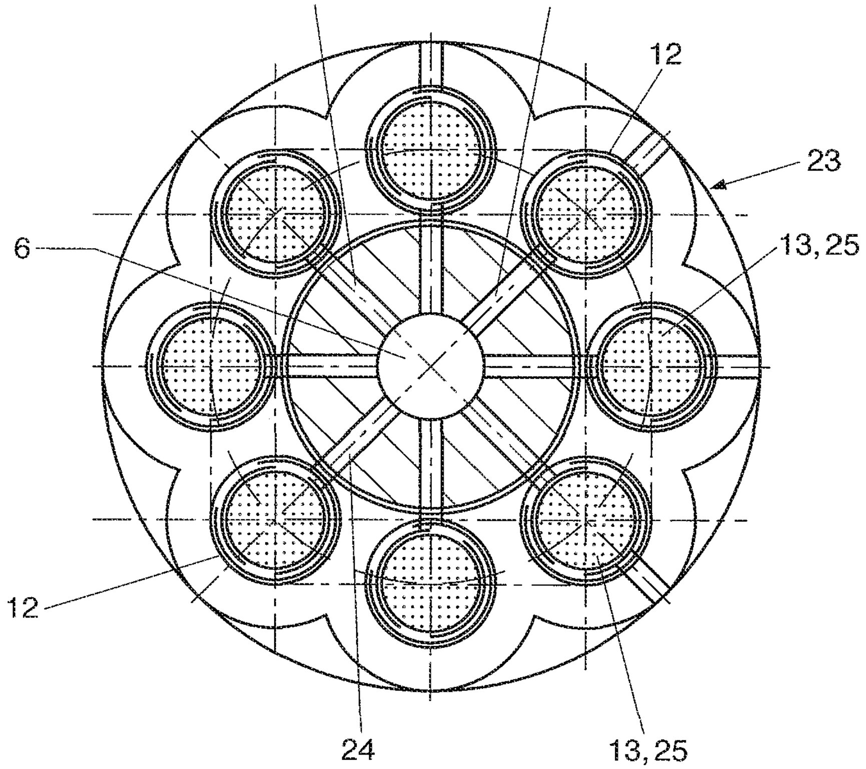
FIG. 6 shows the third embodiment variant shown in FIG. 5 in a plan view.

FIG. 6 shows the embodiment variant shown in FIG. 5 from a plan view. The plurality of outlet openings 12, which are arranged at the same distance from one another along a circular line, can be seen here.

Figure 7:
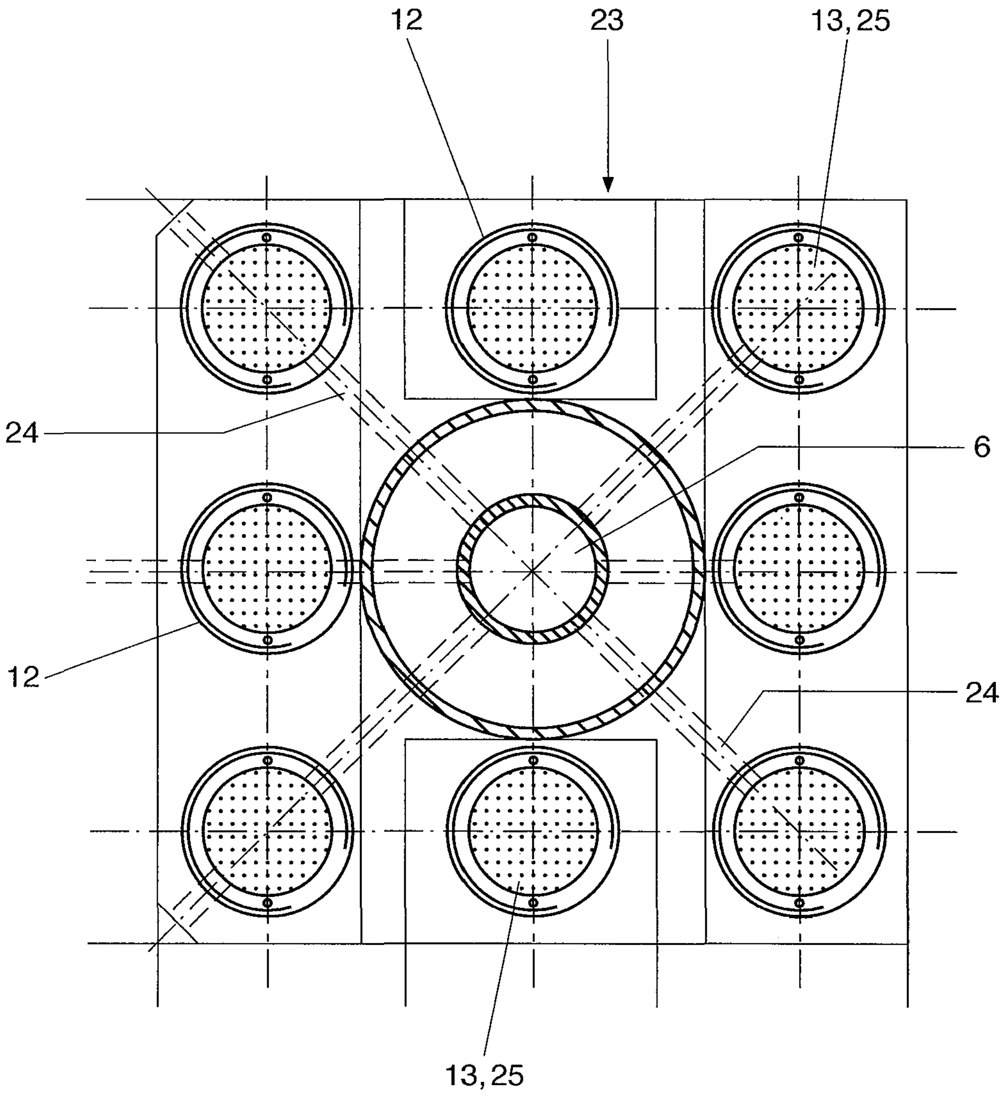
FIG. 7 shows a fourth embodiment variant of the gas injection device according to the invention in a plan view.

FIG. 7 shows a fourth embodiment variant of the gas injection device 1 according to the invention in a plan view. In contrast to the embodiment variant according to FIGS. 5 and 6, the shower head 23 is formed as a square, wherein the majority of the outlet openings 12 is arranged along a quadrangular peripheral line.

Figure 8:
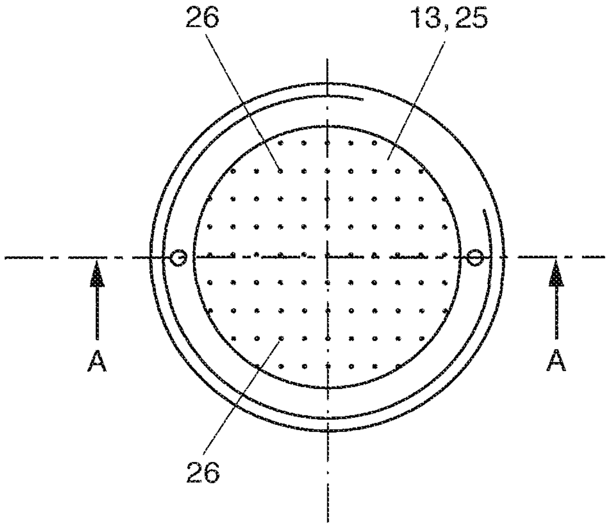
FIG. 8 shows an embodiment variant of a perforated plate in a plan view.
Figure 9:
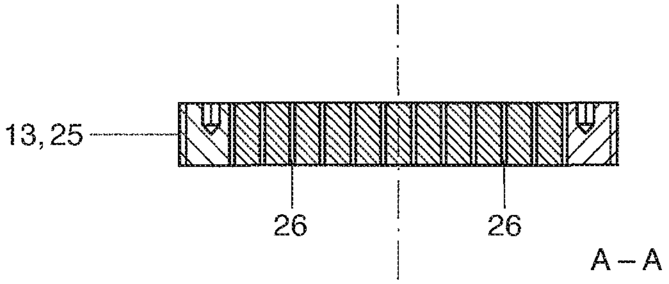
FIG. 9 shows the embodiment variant of the perforated plate shown in FIG. 8 in a cross-sectional representation according to section plane A-A.

In FIGS. 8 and 9, the through-flow element 13 formed in the form of the perforated plate 25 is shown in a plan view. The individual openings 26 of the perforated plate 25 through which the process gas can be injected into the non-ferrous metal melt and/or the slag can be seen from the two representations. The distance between the openings 26 in the embodiment represented here is 5 times the opening diameter of the opening 26.

Figure 10:
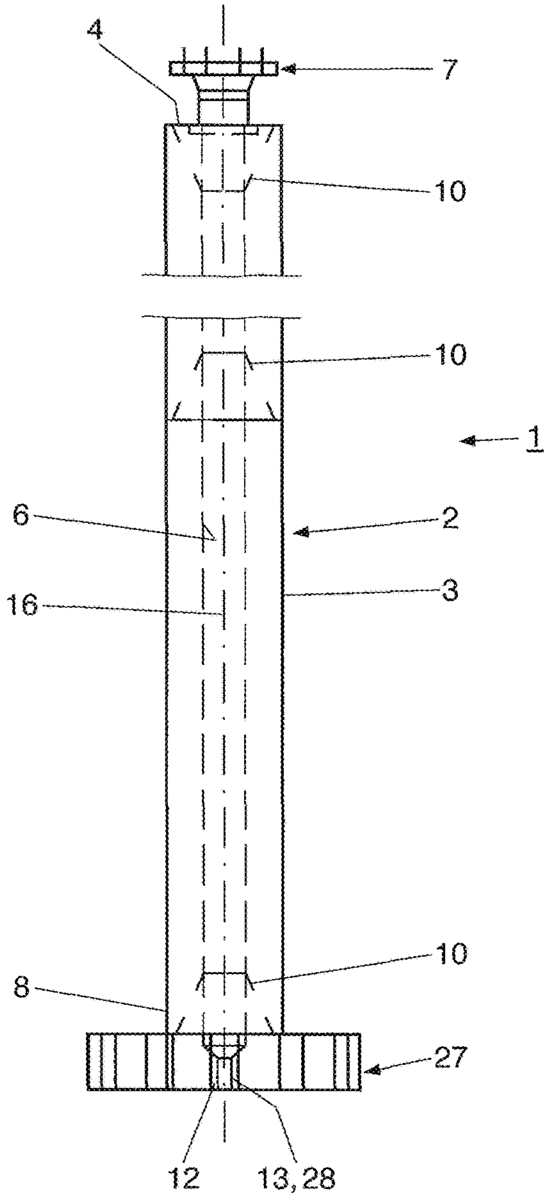
FIG. 10 shows a fifth embodiment variant of the gas injection device according to the invention.

FIG. 10 shows a further embodiment variant of the gas injection device 1 according to the invention. Here, the gas injection module is formed in the form of an impeller wheel 27 which comprises a centrally arranged outlet opening 12. The through-flow element 13 formed from the ceramic material is formed in the form of a cylindrical sleeve 28 open on both sides, which is inserted into the outlet opening 12 and firmly connected to the impeller wheel 27 via a press connection.

Figure 11:
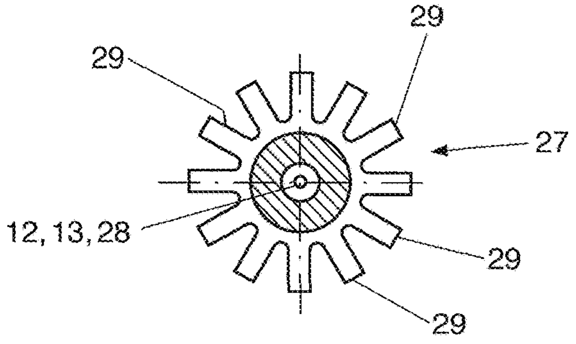
FIG. 11 shows the fifth embodiment variant shown in FIG. 10 in a plan view.

FIG. 11 shows the embodiment variant of the gas injection device 1 shown in FIG. 10 from a plan view, from which the individual impellers 29 of the impeller wheel 27 can be seen.

Figure 12:
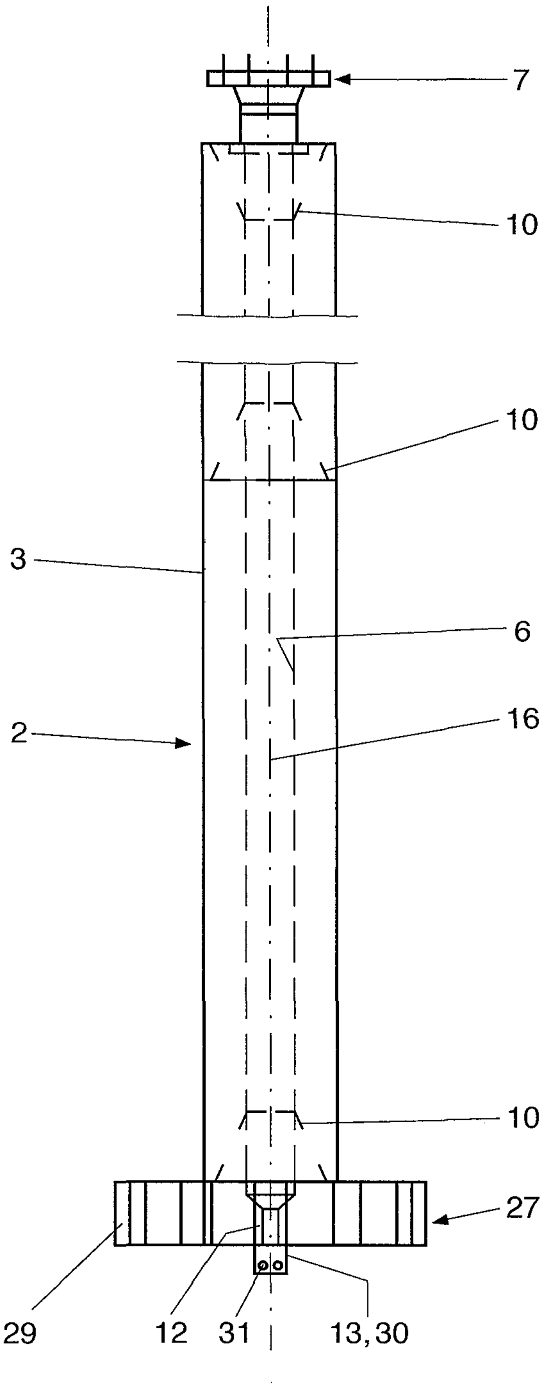
FIG. 12 shows a sixth embodiment of the gas injection device according to the invention.

FIG. 12 shows a further embodiment variant of the gas injection device 1 according to the invention. In contrast to the embodiment variant shown and explained in FIGS. 10 and 11, the through-flow element 13 formed from the ceramic material is formed in the form of a sleeve 30 that is closed on one side and is glued into the central outlet opening 12 of the impeller wheel 27. In this case, the sleeve 30 forms a projection on the underside of the impeller wheel 27 and has several outlet channels 31 arranged perpendicular to its longitudinal axis, via which the process gas can be introduced into the non-ferrous metal melt and/or slag.

LIST OF REFERENCE NUMERALS

1 gas injection device
2 lance
3 lance body
4 first distal end
inlet opening
6 main channel
7 connecting piece
8 second distal end
9 gas injection module
10 screw connection
11 lateral surface
12 outlet openings
13 element
14 nozzle/Laval nozzle
15 longitudinal axis of the outlet opening
16 longitudinal axis of the lance
17 screw connection

18 nut
19 external thread
20 counter thread
21 flange
22 stop surface
23 gas injection module/showerhead
24 channel
25 perforated plate
26 openings
27 gas injection module/impeller wheel
28 sleeve
29 impeller
30 sleeve
31 outlet channels

The invention claimed is:

1. A gas injection device for introducing a process gas into a copper melt and/or copper slag, comprising:

a hollow-cylindrical lance which includes a refractory material and/or graphite, wherein the hollow-cylindrical lance has an inlet opening for the process gas and a gas injection module connected to the hollow-cylindrical lance and including a refractory material and/or graphite, with at least one outlet opening for the process gas, wherein the at least one outlet opening has at least one through-flow element formed from a ceramic material via which the process gas can be introduced into the melt;

the gas injection module is in a form of an impeller wheel and the at least one outlet opening is arranged centrally in the impeller wheel, the through-flow element formed from the ceramic material is in a form of a sleeve that is closed on one side and is inserted into the at least one outlet opening and is firmly connected to the impeller wheel, and the sleeve has at least one outlet channel arranged perpendicular to its longitudinal axis.

2. The gas injection device according to claim 1, wherein the ceramic material is selected from a group comprising silicon carbides, silicon nitrides, silicon aluminum oxide nitrides, boron nitrides, zirconium oxides, titanium oxides, aluminum titanates and/or mixtures thereof.

3. The gas injection device according to claim 1, wherein the hollow-cylindrical lance is formed from at least one individual hollow-cylindrical lance body that can be connected to other individual hollow-cylindrical lance bodies.

4. The gas injection device according to claim 1, wherein the gas injection module is formed in a cup-shape and the at least one outlet opening is arranged in a lateral surface of the gas injection module formed in a cup-shape.

5. The gas injection device according to claim 4, wherein the through-flow element formed from the ceramic material is in a form of a nozzle which is inserted into the at least one outlet opening and is firmly connected to the gas injection module.

6. The gas injection device according to claim 5, wherein the nozzle is arranged in the at least one outlet opening such that its longitudinal axis has an angle of 45° to 90° with regard to the longitudinal axis of the lance.

7. The gas injection device according to claim 5, wherein the nozzle is formed as a Laval nozzle.

8. The gas injection device according to claim 1, wherein the gas injection module is formed in the form of a shower head and has several outlet openings aligned in the direction of the inlet opening.

9. The gas injection device according to claim 8, wherein the through-flow element formed from the ceramic material is in a form of a perforated plate or a porous plate which is inserted into the respective outlet openings of the shower head and is firmly connected to it.

10. The gas injection device according to claim 8, wherein the outlet openings are arranged such that their longitudinal axis has an angle of 0° to 45° with regard to the longitudinal axis of the lance.

11. The gas injection device according to claim 1, wherein the sleeve is a cylindrical sleeve.

12. A plant for the extraction of copper metals, comprising a gas injection device according to claim 1.

13. A plant for treating, cleaning and/or refining of copper slags, comprising a gas injection device according to claim 1.

* * * * *